(12) United States Patent
Chiba

(10) Patent No.: US 11,671,541 B2
(45) Date of Patent: Jun. 6, 2023

(54) IMAGE PROCESSING APPARATUS AND PRODUCT, AND CONTROL METHOD, DYNAMICALLY CHANGING ICON ARRANGEMENT ON MENU SCREENS BASED ON DOCUMENT PLACEMENT ON SCANNER

(71) Applicant: CANON KABUSHIKI KAISHA, Tokyo (JP)

(72) Inventor: Shinichi Chiba, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/477,292

(22) Filed: Sep. 16, 2021

(65) Prior Publication Data
US 2022/0094799 A1 Mar. 24, 2022

(30) Foreign Application Priority Data
Sep. 18, 2020 (JP) .............................. JP2020-157893

(51) Int. Cl.
*H04N 1/00* (2006.01)

(52) U.S. Cl.
CPC ..... *H04N 1/00424* (2013.01); *H04N 1/00013* (2013.01); *H04N 1/00037* (2013.01); *H04N 1/00074* (2013.01); *H04N 1/00474* (2013.01); *H04N 1/00503* (2013.01); *H04N 1/00687* (2013.01); *H04N 1/00771* (2013.01); *H04N 2201/0094* (2013.01)

(58) Field of Classification Search
None
See application file for complete search history.

(56) References Cited

U.S. PATENT DOCUMENTS

| 6,643,037 | B1* | 11/2003 | Jeran | H04N 1/00771 358/475 |
|---|---|---|---|---|
| 9,024,888 | B2 | 5/2015 | Fukumoto | |
| 9,628,657 | B2* | 4/2017 | Hamaguchi | H04N 1/00798 |
| 10,268,934 | B2 | 4/2019 | Fukumoto | |
| 10,944,878 | B2* | 3/2021 | Kurahashi | H04N 1/00074 |
| 2009/0219558 | A1* | 9/2009 | Murakami | H04N 1/387 358/452 |
| 2011/0242024 | A1 | 10/2011 | Fukumoto | |
| 2015/0116760 | A1* | 4/2015 | Kim | H04N 1/00503 358/1.15 |
| 2015/0278652 | A1 | 10/2015 | Fukumoto | |

FOREIGN PATENT DOCUMENTS

| JP | 2011210009 A | 10/2011 |
|---|---|---|
| JP | 2017118255 A * | 6/2017 |

OTHER PUBLICATIONS

JPP translation of JP-2017118255-A (Year: 2017).*

* cited by examiner

*Primary Examiner* — Scott A Rogers
(74) *Attorney, Agent, or Firm* — Canon U.S.A., Inc. IP Division

(57) ABSTRACT

In a case where it is determined that a document is left behind, a display control unit is configured to control display of an icon using a result of detection by a second detection unit without using at least a result of detection by a first detection unit.

22 Claims, 13 Drawing Sheets

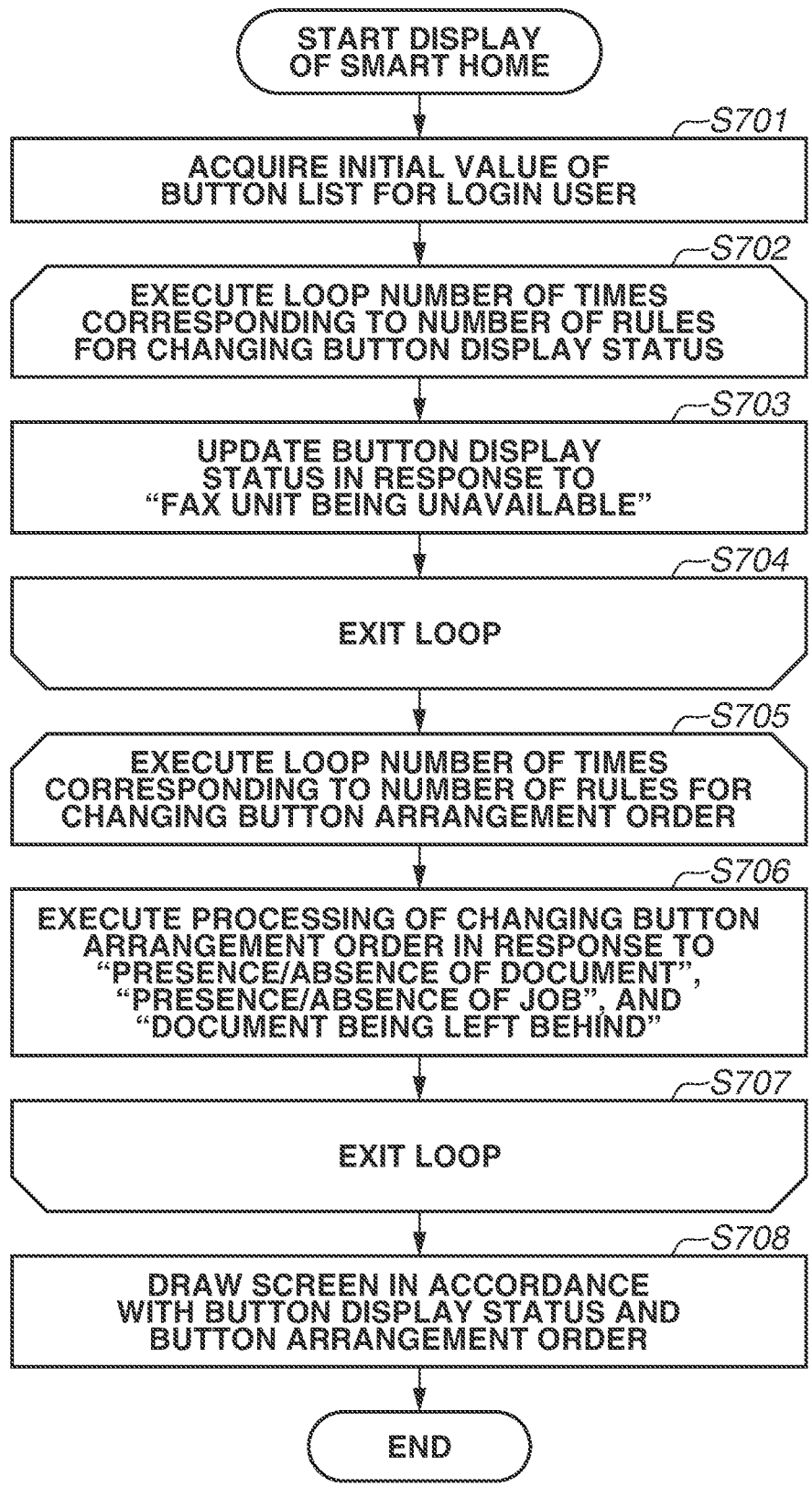

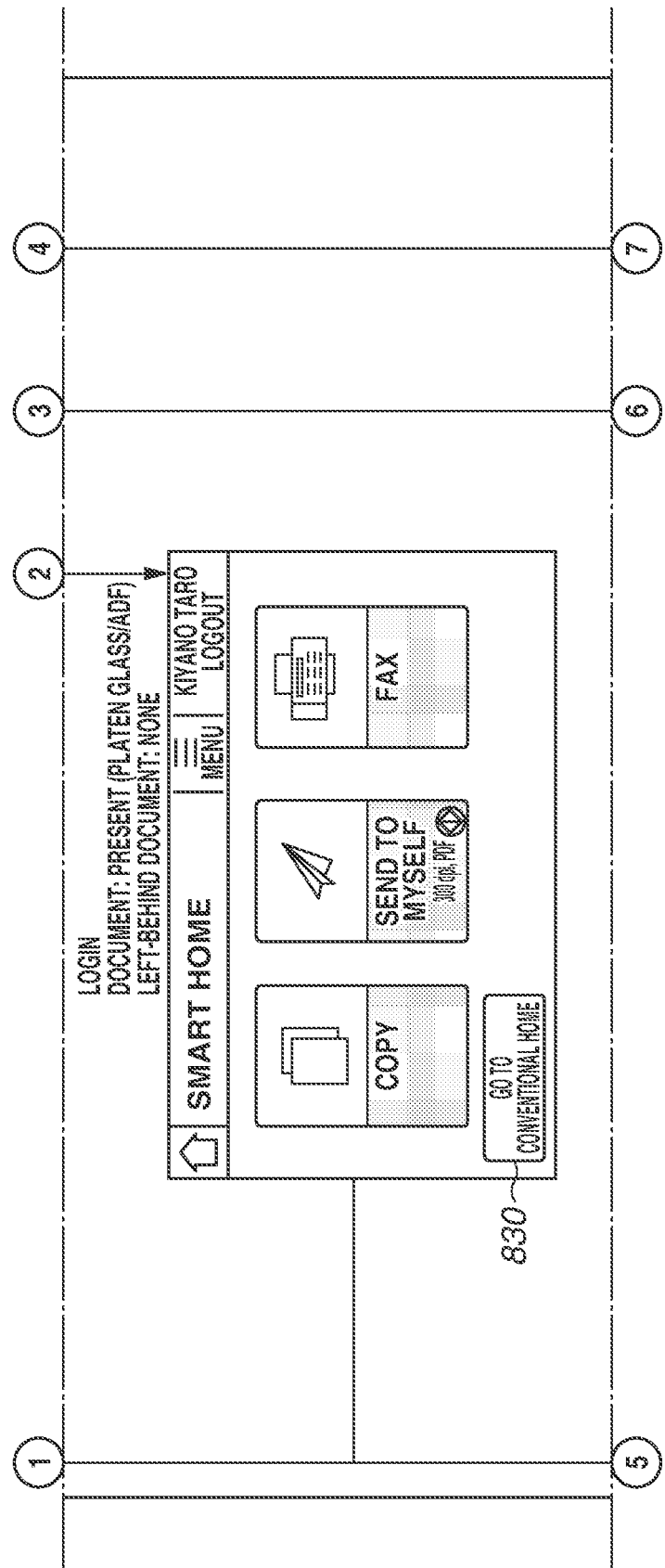

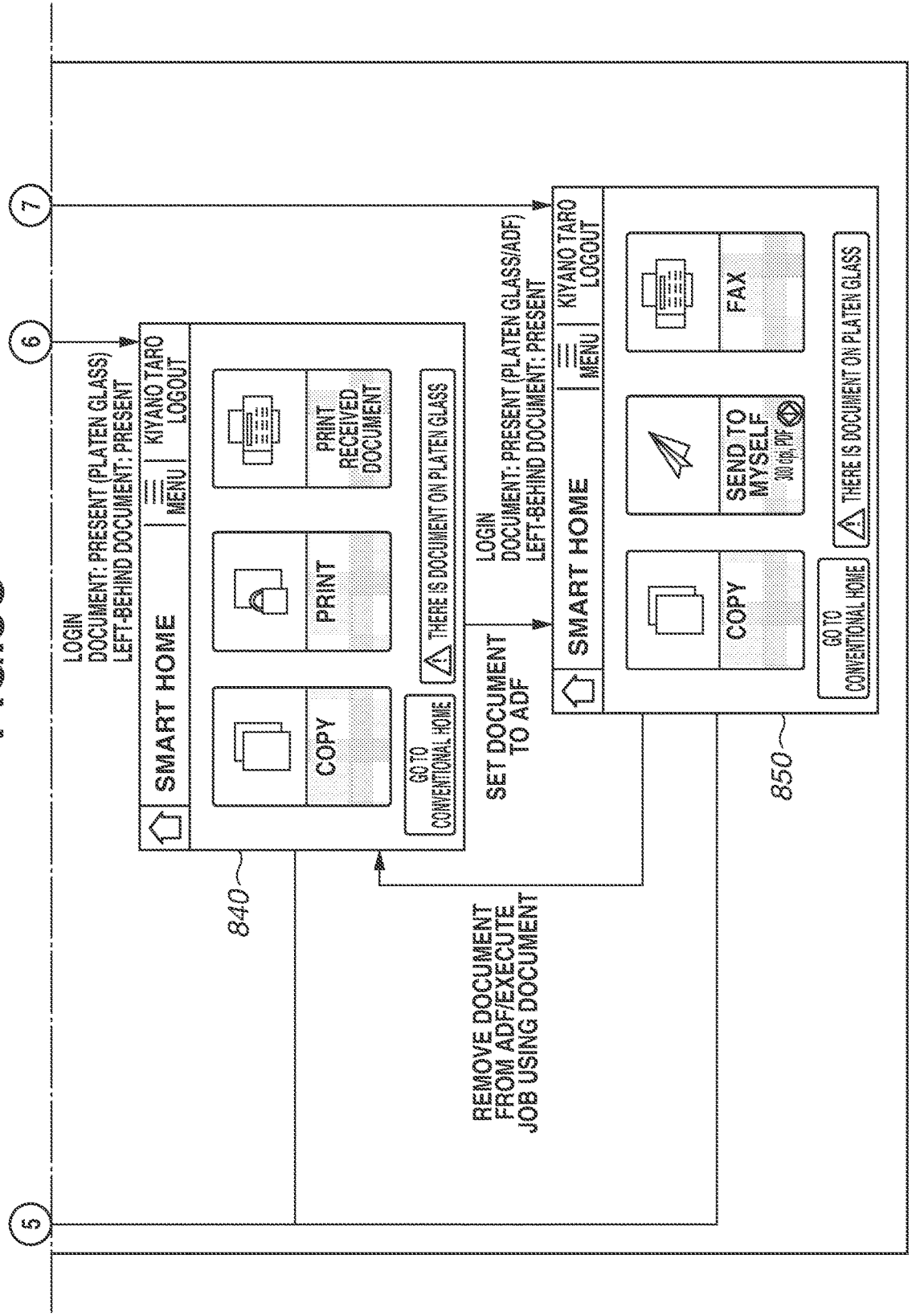

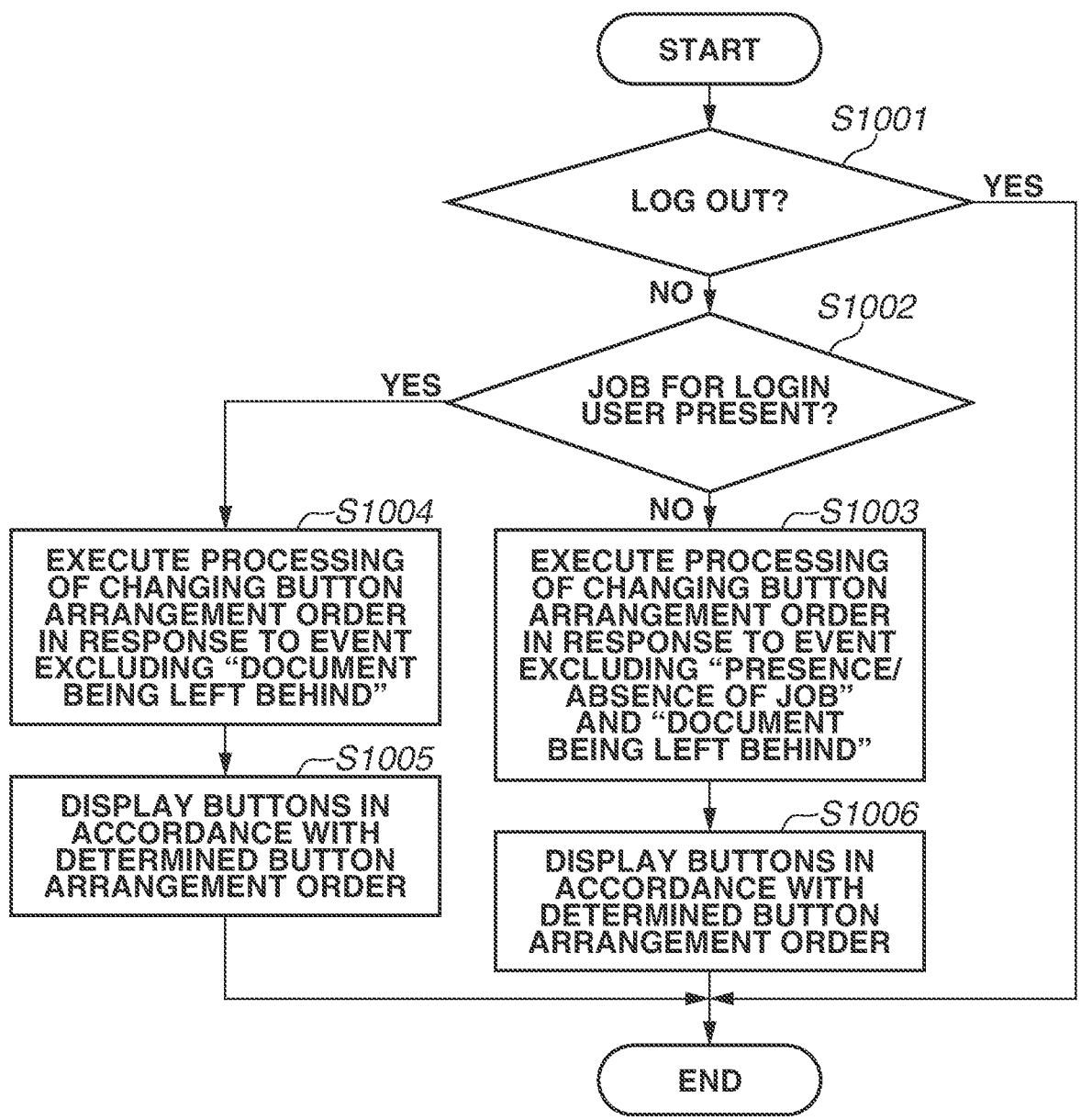

IMAGE PROCESSING APPARATUS AND PRODUCT, AND CONTROL METHOD, DYNAMICALLY CHANGING ICON ARRANGEMENT ON MENU SCREENS BASED ON DOCUMENT PLACEMENT ON SCANNER

BACKGROUND

Field of the Disclosure

The present disclosure relates to a control method for an image processing apparatus that performs icon display control, and a storage medium.

Description of the Related Art

There is an image processing apparatus capable of displaying, on an operation unit, a menu screen for presenting a button that enables execution of functions of the apparatus, such as a copy function and a scan function, to a user after the user logs in to the apparatus. The user can make an instruction for setting or executing a function by pressing the button on the menu screen. For example, Japanese Patent Application Laid-Open No. 2011-210009 discusses a technique of displaying a multitude of buttons on a home screen that appears when a user logs in to an image processing apparatus. Examples of the buttons include a button for selecting a copy mode, a button for comprehensively selecting transmission-related modes, and a button for individually selecting a transmission-related mode, such as a mode for transmitting an e-mail or a mode for transmitting FAX.

In a case where a multitude of buttons are arranged on the home screen as discussed in Japanese Patent Application Laid-Open No. 2011-210009, a user has difficulty in finding a desired button. To address this issue, a conceivable configuration is to change a method of displaying buttons on the menu screen in accordance with the status of the image processing apparatus. Examples of the method of displaying buttons include a method of changing a button display order, a method of displaying/hiding buttons, and a method of shading the buttons. The status of the image processing apparatus indicates the presence/absence of a print job, the presence/absence of a document on a platen glass, or the like. For example, a conceivable configuration is to display a button corresponding to the copy function or the scan function on the home screen on a priority basis in a case where there is a document on the platen glass. By adopting the configuration, a button that is expected to be used by a user is displayed on the home screen on a priority basis, and thus convenience improves.

However, if a document that is left behind on the platen glass, instead of a document intentionally placed on the platen glass by a user, has an influence on a method of displaying buttons, a button other than a button that is about to be used by the user is displayed on a priority basis, and thus convenience decreases.

SUMMARY

Some embodiments in the present disclosure are directed to a technique of preventing change in button display order by a document that is left behind by a user.

According to an aspect of some embodiments, an image processing apparatus having a plurality of functions includes a reading unit configured to read a document, a first detection unit configured to detect a document placed on the reading unit, a display control unit configured to control a display method of displaying an icon corresponding to each of the plurality of functions using at least a result of the detection by the first detection unit on a menu screen for selecting at least one function from the plurality of functions, and a determination unit configured to determine whether a document is left behind on the reading unit, wherein, in a case where the determination unit determines that the document is left behind, the display control unit is configured to control display of the icon using a result of detection by a second detection unit without using at least the result of the detection by the first detection unit.

Further features of various embodiments will become apparent from the following description of exemplary embodiments (with reference to the attached drawings).

BRIEF DESCRIPTION OF THE DRAWINGS

FIG. 7 is a flowchart illustrating an example for displaying a smart home screen.

FIGS. 8A to 8C are a flowchart illustrating an example of the screen flow of the smart home screen.

FIG. 10 is a flowchart illustrating an example for displaying a smart home screen according to a second exemplary embodiment.

DESCRIPTION OF THE EMBODIMENTS

Exemplary embodiments will be described below with reference to the accompanying drawings.

The following exemplary embodiments do not limit the claims, and all combinations of features described in the following exemplary embodiments are not necessarily essential to all embodiments.

<Image Processing Apparatus>

Figure 1:
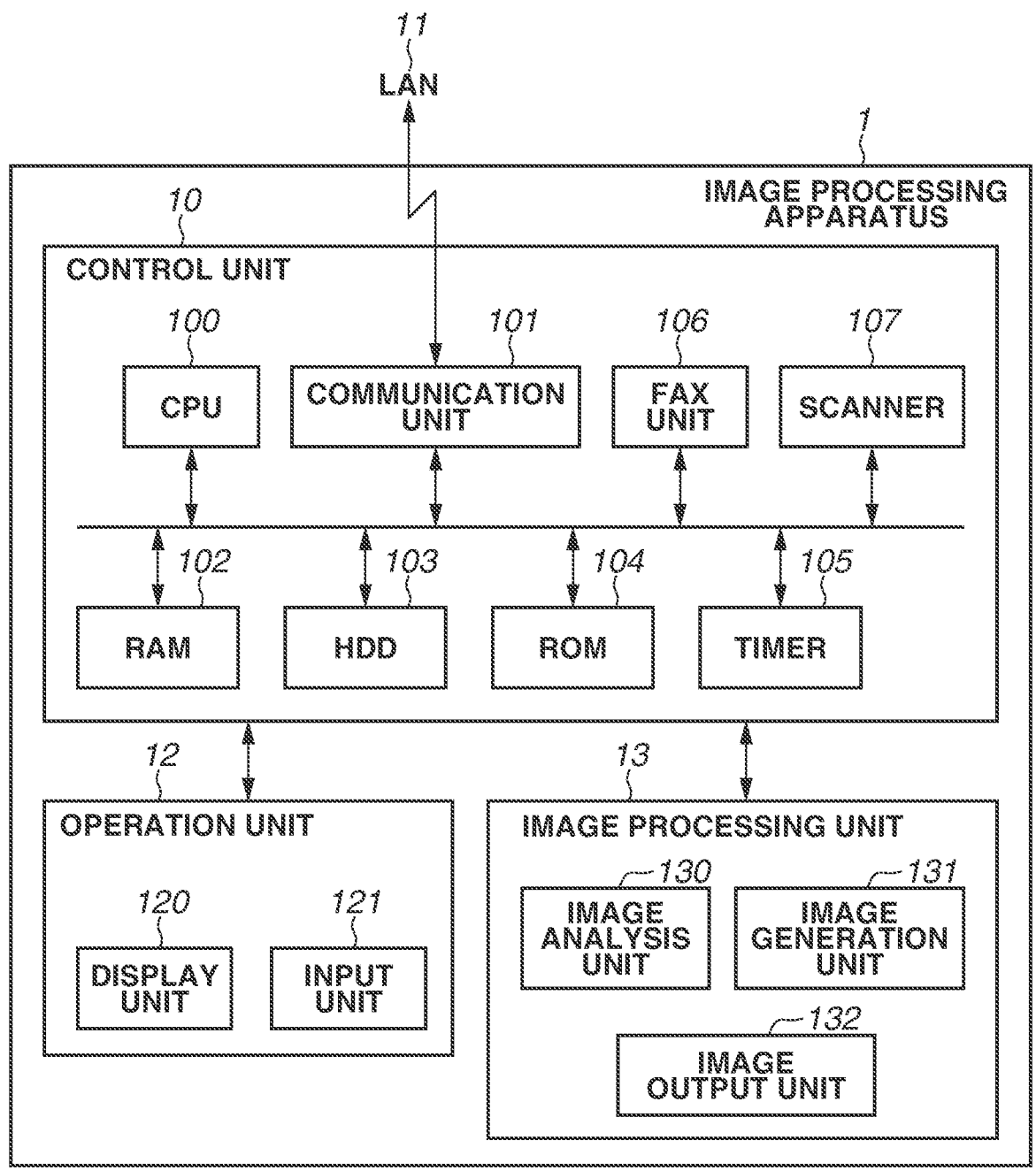
FIG. 1 is a block diagram illustrating a configuration of an image processing apparatus according to an exemplary embodiment.

FIG. 1 is a block diagram illustrating a configuration of an image processing apparatus 1 according to a first exemplary embodiment. The image processing apparatus 1 is composed of a control unit 10, an operation unit 12, and an image processing unit 13.

The control unit 10 controls operations of each unit of the image processing apparatus 1. The control unit 10 includes a central processing unit (CPU) 100, a local area network (LAN) 11, a communication unit 101, a random-access memory (RAM) 102, a hard disk drive (HDD) 103, a read-only memory (ROM) 104, a timer 105, a FAX unit 106, and a scanner 107. The CPU 100 controls the whole of the control unit 10. The LAN 11 is a network for exchanging data with an external apparatus, and the image processing apparatus 1 is connected to the Internet via the LAN 11. The communication unit 101 transmits/receives data via the LAN 11. The RAM 102 provides a system work memory for the CPU 100 to operate. The HDD 103 is a hard disk drive, and may also be a storage medium, such as a magnetic disk, an optical medium, or a flash memory. The HDD 103 can store therein document data, setting data, and the like. In addition, the HDD 103 may not be arranged in the image processing apparatus 1. An external server, a personal computer (PC), or the like may be utilized as a data storage apparatus via the communication unit 101. The ROM 104 is a boot ROM, and stores therein a system's boot program. The CPU 100 loads a program installed in the HDD 103 to the RAM 102 using the boot ROM of the ROM 104, and performs various kinds of control based on the program. The timer 105 counts a time in accordance with an instruction from the CPU 100, and notifies the CPU 100 of the elapse of an instructed time by means of an interruption or the like. The FAX unit 106 transmits/receives FAX data via a telephone line (not illustrated).

The scanner 107 reads a document. Examples of types of the scanner 107 include an auto document feeder (ADF) that automatically conveys a document and a platen glass on/from which a user manually places/removes a document. The scanner 107 includes a sensor that detects the presence/absence of a document, a sensor that senses opening/closing of the platen glass, and the like. The CPU 100 thus can determine, for example, a state in which a document is left behind on the platen glass, in accordance with a result of detection by each sensor (the status of each sensor and a status change). In the present exemplary embodiment, a "document left-behind status" represents a status in which a document used once is left behind on the platen glass. This is because the ADF according to the present exemplary embodiment automatically conveys a document placed at a document detection position to a document discharge position that is different from a document reading position, and thus prevents occurrence of an issue of erroneously reading the document again. In the present exemplary embodiment, the detection of the presence/absence of a document may be determined with each of the ADF and the platen glass, or may be determined from the status of the ADF and that of the platen glass in a combined manner.

The operation unit 12 is controlled by the control unit 10, and includes a display unit 120 and an input unit 121. The display unit 120 is a display for displaying information of the image processing apparatus 1 to the user. The input unit 121 accepts operation inputs from the user via interfaces, such as a touch panel, a mouse, a camera, an audio input device, and a keyboard.

The image processing unit 13 is controlled by the control unit 10, and includes an image analysis unit 130, an image generation unit 131, and an image output unit 132. The image analysis unit 130 analyzes a structure of a document image, and extracts necessary information from an analysis result. The image generation unit 131 reads the document (for example, by scanning), digitizes the document image, generates image data, and then stores the data in the HDD 103. The image generation unit 131 can also generate document image data in another format using the information obtained by the analysis of the image analysis unit 130. The image output unit 132 outputs the image data stored in the HDD 103 or the like. Examples of an output method include a method of printing the image data of a document on paper, a method of transmitting the image data to an external device, a server, a facsimile device, or the like that is connected to the network via the communication unit 101, and a method of storing the image data on a storage medium connected to the image processing apparatus 1.

Figure 2:
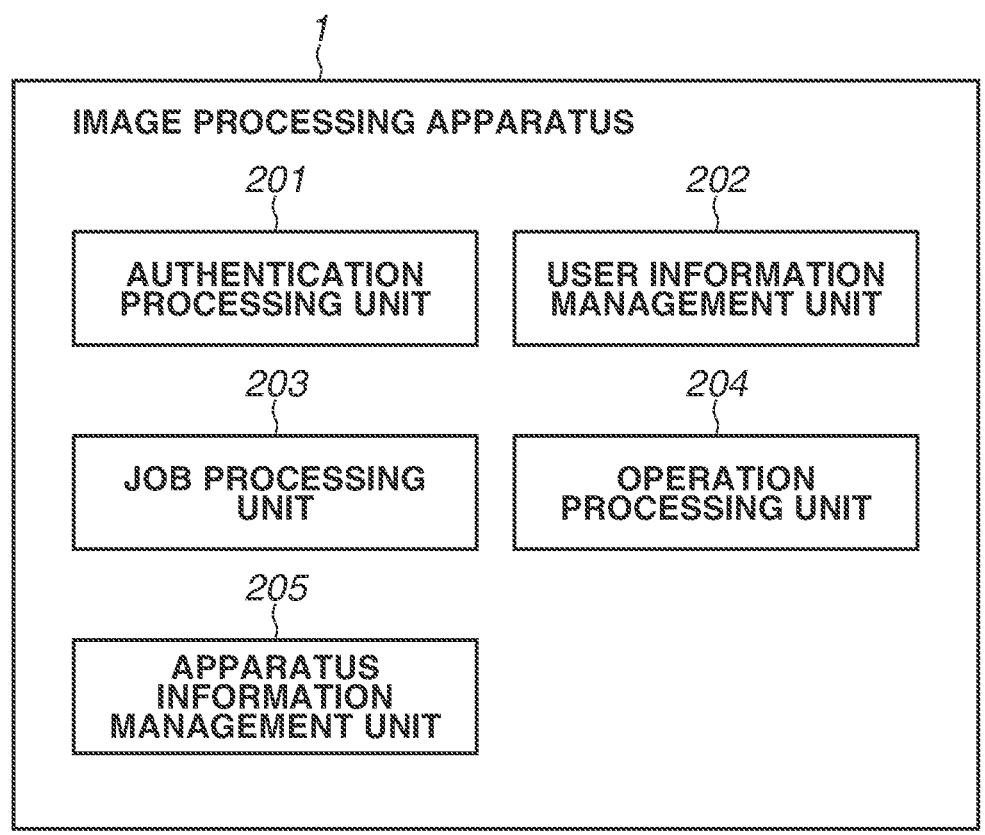
FIG. 2 is a block diagram illustrating an example of a functional configuration of the image processing apparatus.

FIG. 2 is a block diagram illustrating an example of a functional configuration of the image processing apparatus 1 illustrated in FIG. 1. The image processing apparatus 1 includes an authentication processing unit 201, a user information management unit 202, a job processing unit 203, an operation processing unit 204, and an apparatus information management unit 205. Each of these function units has a function implemented by the CPU 100 based on a program that is installed in the HDD 103 and loaded by the CPU 100 to the RAM 102 using the boot ROM of the ROM 104.

The authentication processing unit 201 receives a login/logout request from a user, and performs processing of authenticating input user information and identifying a user who uses the image processing apparatus 1. The user information management unit 202 manages information of the user identified by the authentication processing unit 201. For example, the user information management unit 202 manages a language to be used for each user (for example, English and Japanese), and switches the language in accordance with a login user. In addition, the user information management unit 202 can manage a print job received from an external apparatus via the communication unit 101 for each user who inputs a job.

The job processing unit 203 performs processing on various kinds of jobs executed in the image processing apparatus 1. Specifically, the job processing unit 203 controls the image generation unit 131 to execute a scan job using the scan function, controls the image output unit 132 to execute a print job, and controls the communication unit 101 to transmit a job.

The operation processing unit 204 controls the display unit 120 to display various kinds of information to a user. Furthermore, the operation processing unit 204 receives a user's operation instruction input from the input unit 121 and performs processing in accordance with the instruction. The apparatus information management unit 205 manages information regarding the whole of the image processing apparatus 1. Specific examples of the information include an Internet Protocol (IP) address allocated to the image processing apparatus 1 and a setting value common to all users who utilize the image processing apparatus 1. The apparatus information management unit 205 can also manage information of the same kind as that managed by the user information management unit 202. For example, in a case where a common setting for the language to be used is set to English, the apparatus information management unit 205 presents to a user a message in English when the user who has not yet set the language to be used utilizes the apparatus. However, in a case where a user has set the language to be used to Japanese, the apparatus information management unit 205 also can present a message in Japanese to this user.

Figure 3:
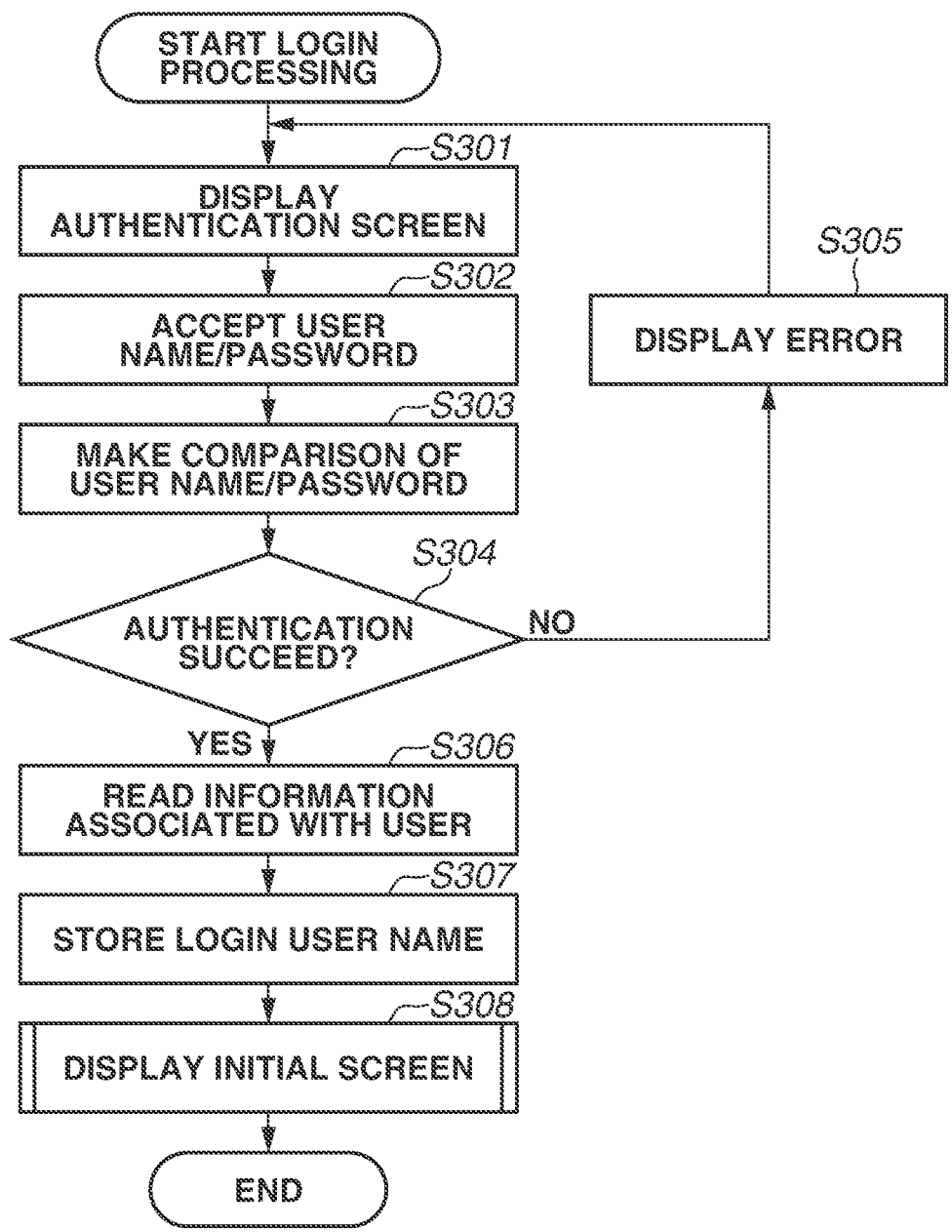
FIG. 3 is a flowchart illustrating an example of processing from start-up of the image processing apparatus to display of a screen to a login user.

Subsequently, processing from start-up of the image processing apparatus 1 to display of a screen for a login user will be described with reference to a flowchart in FIG. 3. The flowchart in FIG. 3 is implemented by the authentication processing unit 201, the user information management unit 202, the job processing unit 203, the operation processing unit 204, and the apparatus information management unit 205.

Figure 4:
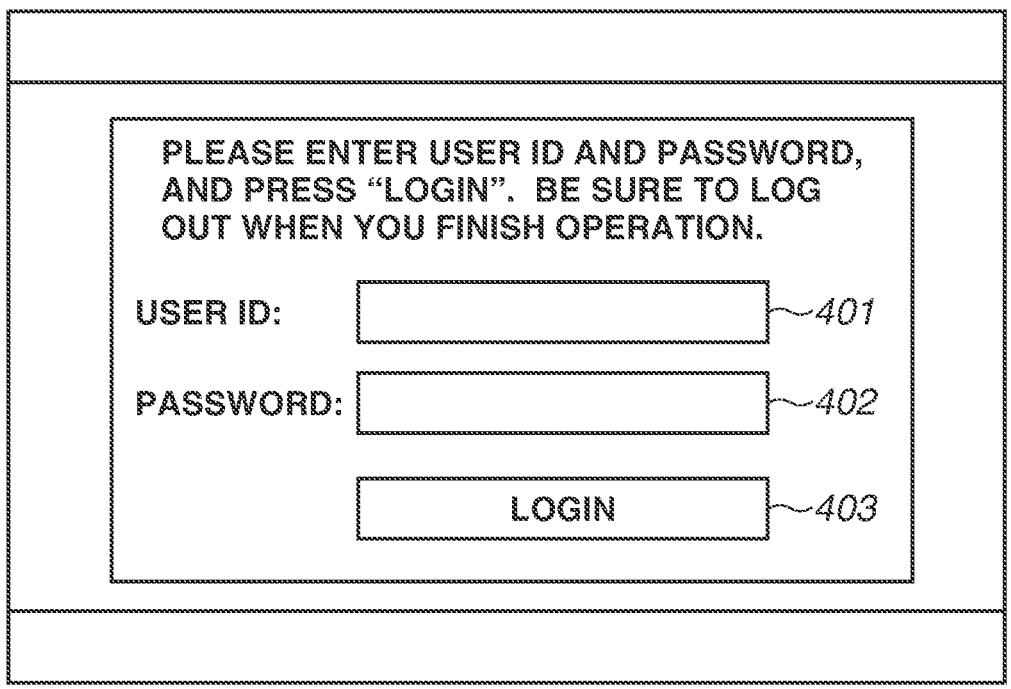
FIG. 4 is a schematic diagram illustrating an example of an authentication screen.

In S301, the authentication processing unit 201 displays a login screen on the display unit 120. The authentication processing unit 201 determines whether a login request has been given. Specifically, the authentication processing unit 201 displays the login screen (illustrated in FIG. 4) on the display unit 120, and a user enters a user identification (ID)

and a password on the login screen via the input unit 121. Selecting a login key 403 transmits the login request to the authentication processing unit 201. FIG. 4 is a diagram illustrating an example of the login screen to be displayed on the display unit 120. The user enters a login user ID in a user ID entry field 401, and a password in a password entry field 402.

In S302, the authentication processing unit 201 accepts the user ID and the password as a login request. Alternatively, the login request may be given as an input from an integrated circuit (IC) card reading apparatus connected to the input unit 121 of the image processing apparatus 1 or an input from a biometric authentication apparatus by fingerprint authentication. In S303, when receiving the login request, the authentication processing unit 201 makes a comparison about whether a user ID and a password that are stored in the HDD 103 match the user ID and the password that have been accepted in S302, respectively.

In a case where the authentication processing unit 201 determines that "the entered user name and password are not matched" (NO in S304), the processing proceeds to S305. In S305, the authentication processing unit 201 displays an error message for a predetermined time on the display unit 120 via the operation processing unit 204. The authentication processing unit 201 then displays the login screen (illustrated in FIG. 4) on the display unit 120 via the operation processing unit 204 (in S301). In a case where the authentication processing unit 201 determines that the entered user name and password are matched (YES in S304), the processing proceeds to S306. In S306, the user information management unit 202 calls for information that is associated with the user and stored in the HDD 103.

Subsequently, in S307, the user information management unit 202 stores the user name with respect to which the authentication has succeeded in S304 as a current login user in the HDD 103. Subsequently, in S308, the operation processing unit 204 displays on the display unit 120 an initial screen that reflects the information of the login user that has been called for. The initial screen in the present exemplary embodiment is a screen to be presented to a user immediately after the user logs in to the image processing apparatus 1. Examples of the initial screen include a screen for an application of various kinds including a copy application that enables setting and execution of the copy function, and a menu screen (herein after referred to as a home screen), on which buttons that enable execution of applications of various kinds are arranged. Assume that which of the initial screens is to be displayed can be set in advance by a user or an administrator of the image processing apparatus 1. For the purpose of illustration, assume that the home screen is displayed as the initial screen in this example.

Figure 5:
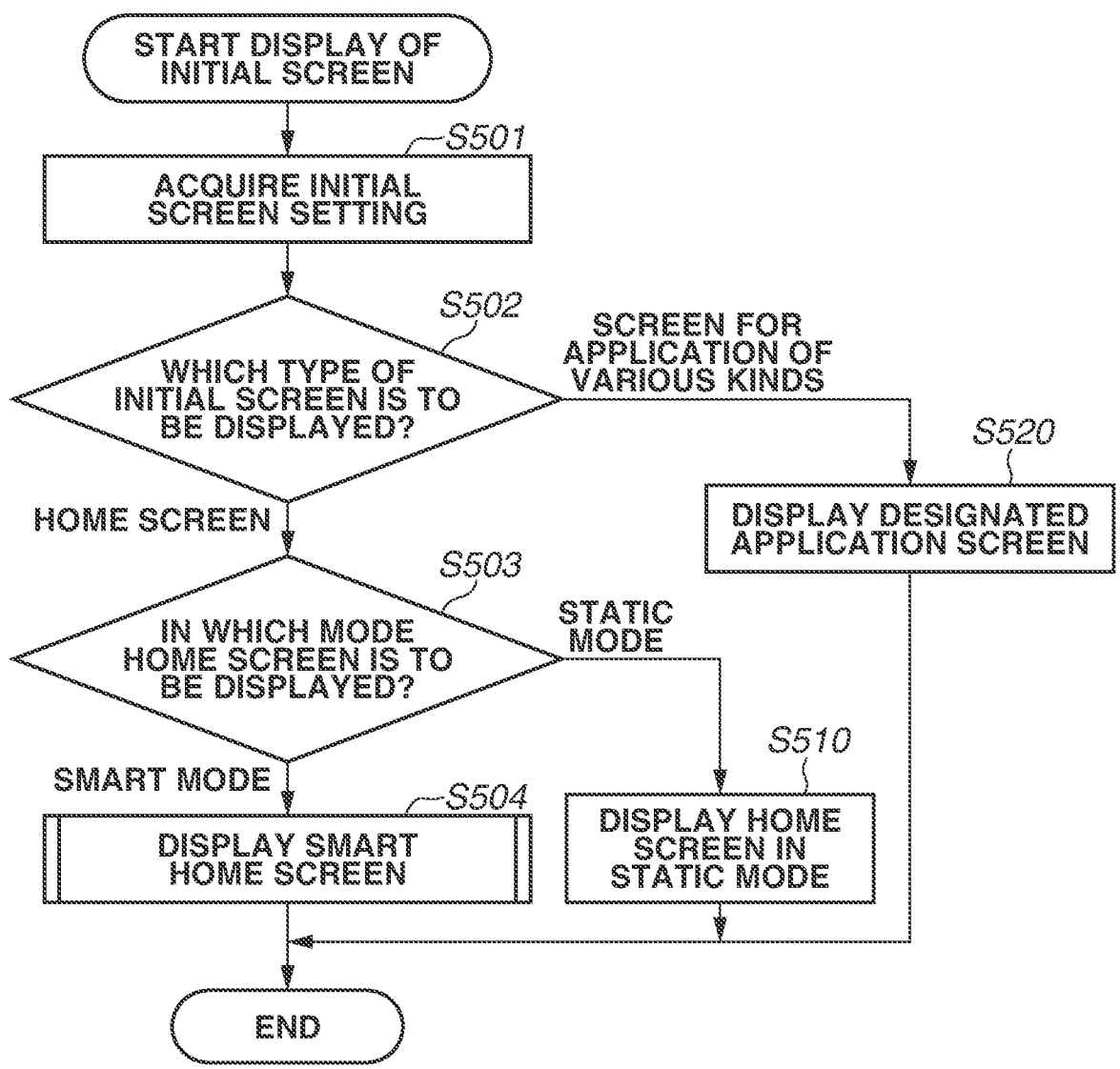
FIG. 5 is a flowchart illustrating an example for displaying an initial screen.

Subsequently, processing executed at the time of displaying the initial screen in S308 will be described in detail with reference to a flowchart in FIG. 5. The flowchart in FIG. 5 is implemented by the authentication processing unit 201, the user information management unit 202, the job processing unit 203, the operation processing unit 204, and the apparatus information management unit 205.

In S501, the operation processing unit 204 acquires setting information regarding the initial screen that should be presented to the login user from the user information management unit 202 and the apparatus information management unit 205. Specifically, if setting information of the initial screen unique to the login user is set in advance in the user information management unit 202, the operation processing unit 204 uses this setting information. Otherwise, the operation processing unit 204 uses setting information of the initial screen that is stored as default information in the apparatus information management unit 205.

Figure 6A:
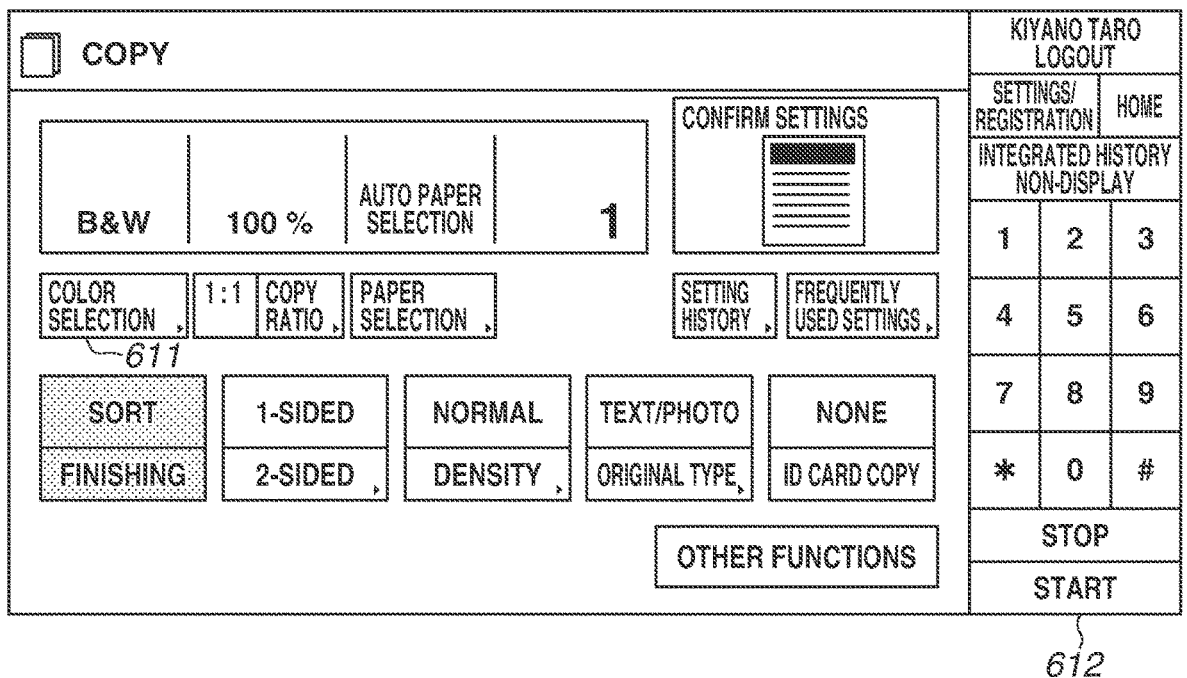
FIGS. 6A to 6D are diagrams each illustrating an example of the initial screen.

Subsequently, in S502, the operation processing unit 204 determines a type of the initial screen that should be displayed, based on the setting information of the initial screen that is acquired in S501. In a case where the type of the initial screen determined in S502 is a screen for an application of various kinds, such as a copy application (illustrated in FIG. 6A), the processing proceeds to S520. In S520, the operation processing unit 204 displays an application screen as the initial screen on the operation unit 12, and then ends the processing. FIG. 6A illustrates an example of a copy application screen as an example of the screen for the application of various kinds. The copy application accepts an execution condition for executing copy from a user via a color selection button 611 or the like. A start button 612 for accepting an instruction for starting copying with a displayed setting content is arranged on the copy application screen. When detecting that this button is pressed, the operation processing unit 204 gives an instruction for execution of a job to the job processing unit 203 based on the setting content.

Figure 6B:
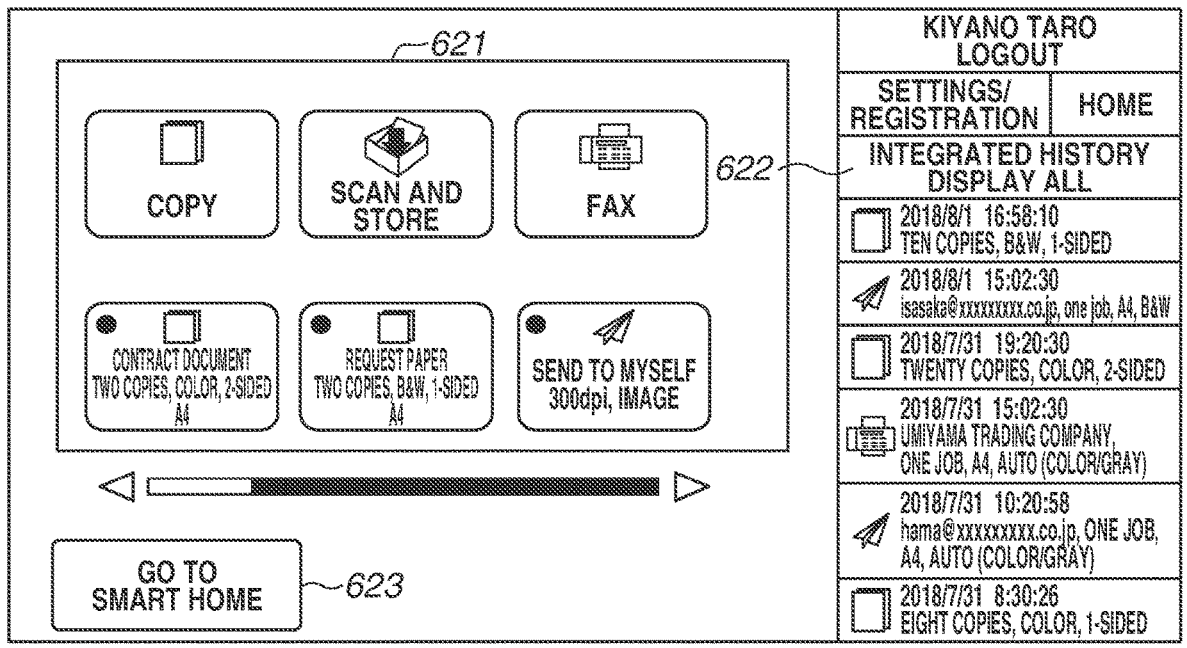

In a case where a type of the initial screen determined in S502 is the home screen, the processing proceeds to S503. In S503, the operation processing unit 204 determines a mode of the home screen based on setting information regarding the initial screen. The number, types, and forms of buttons to be displayed on the home screen are different depending on a mode. In a case where the mode of the home screen is a static mode in S503, the processing proceeds to S510. In S510, the operation processing unit 204 displays the home screen in the static mode (illustrated in FIG. 6B) on the operation unit 12, and ends the processing. FIG. 6B illustrates an example of the home screen in the static mode. A button area 621, a history display area 622, and the like are arranged on the home screen in the static mode. In the button area 621, applications that can be utilized by a user are displayed as buttons. In the history display area 622, a history of settings of jobs that have been executed by the user so far is displayed. The history displayed in the history display area 622 is different for each user who logs in to the image processing apparatus 1. In addition, a smart mode switching button 623 for switching to the home screen in a smart mode (hereinafter referred to as a smart home screen), which will be described below, is arranged on the home screen in the static mode.

Figure 6C:
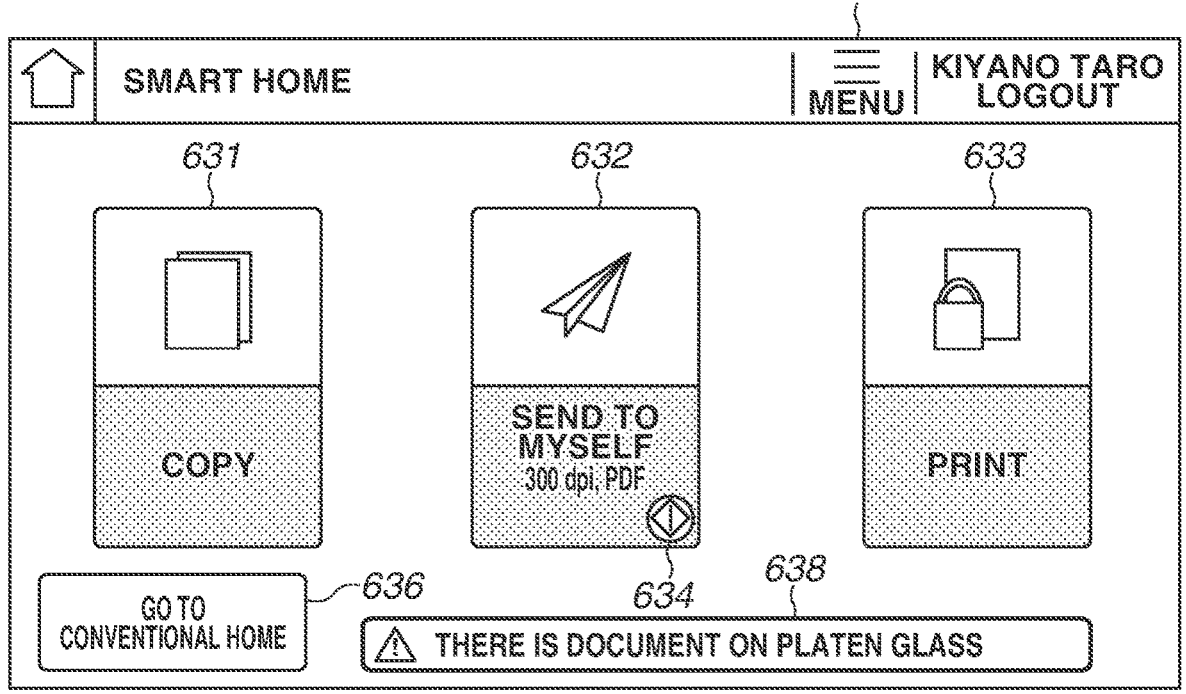

In a case where the mode of the home screen is the smart mode in S503, the processing proceeds to S504. In S504, the operation processing unit 204 displays the smart home screen (illustrated in in FIG. 6C) on the display unit 120, and ends the processing. FIG. 6C illustrates an example of the smart home screen. Unlike the home screen in the static mode, the smart home screen dynamically changes buttons to be displayed in accordance with the status of the image processing apparatus 1 and then displays the buttons. Examples of the status of the image processing apparatus 1 include a situation with respect to reception of a print job or a FAX job, a status as to whether a document is set on the platen glass or ADF of the scanner 107, and a status as to whether various kinds of functions of the image processing apparatus 1 are available. In the present exemplary embodiment, the number of buttons to be displayed is three in the case of the smart home screen, and is less than the number in the case of the home screen in the static mode. However, the number of buttons in each mode is not limited thereto.

The buttons displayed on the smart home screen are referred to as smart buttons 631 to 633. The smart buttons 631 to 633 may be configured as follows. In addition to the smart buttons 631 and 633 for making a transition to an application screen, such as a copy application screen, the smart button 632 that starts execution of a job with a predetermined setting merely by being pressed without displaying the application screen (hereinafter referred to as an immediate execution button) is arranged. For example, the immediate execution button 632 enables execution of processing of scanning a document and transmitting a scanned image to a transmission destination, such as an e-mail address preliminarily associated with the login user, without displaying a scan application screen.

Figure 6D:
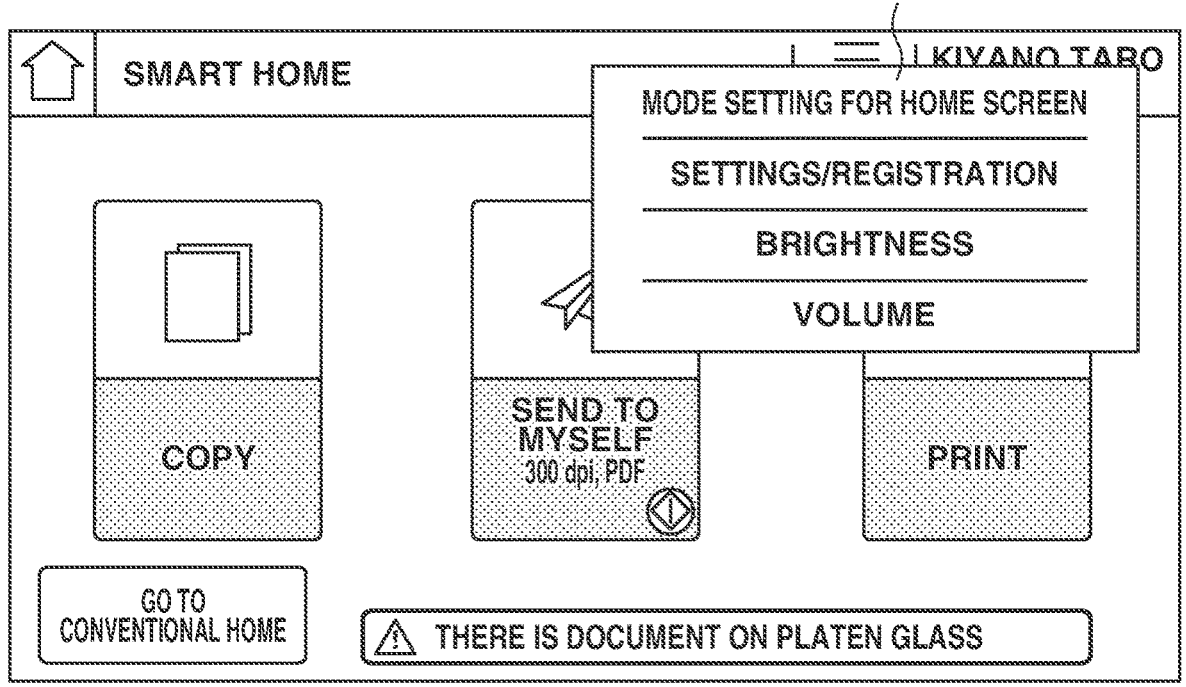

In the present exemplary embodiment, an immediate execution icon 634 indicating immediate execution of a job is arranged on the immediate execution button, so that the immediate execution button is differentiated in appearance from the other application buttons. In addition, a menu button 635 is arranged on the smart home screen. Pressing the menu button 635 displays a menu screen (illustrated in FIG. 6D) that enables display and change of various kinds of settings. Various kinds of menu items, including a mode setting menu 637 for setting a mode of the home screen, are displayed on the menu screen. Information set on the mode setting menu 637 is information referred to in S503.

The smart home screen further includes a status notification area 638 (illustrated in FIG. 6C), which notifies a user of the status of the image processing apparatus 1, including a document being left behind and the shortage of consumable goods, such as toner. In addition, a static mode switching button 636 for making a transition to the home screen in the static mode exemplified in FIG. 6B is arranged on the smart home screen.

Each of the home screen in the static mode illustrated in FIG. 6B and the smart home screen illustrated in FIG. 6C is a screen for calling for an application screen or executing a job with a predetermined setting. However, these home screens in the respective two modes have different functions.

The home screen in the static mode provides basically an identical screen to all users, and then allows a user himself/herself to customize a button arrangement order, and the like. In other words, a user utilizes the home screen that is identical to the home screen presented to other users unless the user himself/herself customizes the home screen.

In contrast, on the smart home screen, the contents and arrangement order of smart buttons presented to the user are changed in accordance with the status of the image processing apparatus 1. Hence, unlike the home screen in the static mode, the smart home screen is characterized in that the user himself/herself need not actively customize the smart home screen.

Subsequently, processing at the time of displaying the smart home screen in S504 will be described in detail with reference to a flowchart in FIG. 7. The flowchart in FIG. 7 is implemented by the authentication processing unit 201, the user information management unit 202, the job processing unit 203, the operation processing unit 204, and the apparatus information management unit 205.

In the present exemplary embodiment, an example of changing a button display status will be described using an example in which the status of the image processing apparatus 1 is a status in which "the FAX unit 106 is not available". In the present exemplary embodiment, a description will be given of an example of determining a button arrangement order using the following statuses of the image processing apparatus 1 as a criterion for determination. The statuses are a status as to whether there is a document on the scanner 107, a status as to whether a print job associated with a login user is accumulated, and the document left-behind status. Assume that the button arrangement order determined by the processing described below is applied to the smart home screen.

In S701, the operation processing unit 204 acquires an initial value of a button list corresponding to the login user from the apparatus information management unit 205 and the user information management unit 202. The button list (in Table 1) is a list of information regarding various kinds of buttons displayed on the home screen. When acquiring the button list, the operation processing unit 204 may be configured to acquire all information from either the apparatus information management unit 205 or the user information management unit 202, or may be configured to acquire information by referring to contents of both of the apparatus information management unit 205 and the user information management unit 202. Table 1 illustrates an example of the button list acquired in S701.

TABLE 1

| Identifier C101 | Button name C102 | Displayable C103 | Immediate execution C104 | Image output-related C105 | Image generation-related C106 | FAX reception-related 107 | Application in use C108 |
| --- | --- | --- | --- | --- | --- | --- | --- |
| 001 | Copy | Yes | NO | Yes | Yes | No | Copy |
| 002 | Print received document | Yes | Yes | Yes | No | Yes | Confidential box |
| 003 | Send to myself | Yes | Yes | No | Yes | No | Scan and send |
| 004 | FAX | Yes | No | No | Yes | No | Fax |
| 005 | Scan and send | Yes | No | No | Yes | No | Scan and send |
| 006 | Print | Yes | No | Yes | No | No | Print |

Each row corresponds to an individual smart button, and each column indicates attributes of various kinds of buttons. An item of an identifier C101 indicates a unique numeric value allocated to a button. An item of a button name C102 indicates a name of a button displayed on the smart home screen. An item of displayable C103 indicates whether a button is available to a login user in the current situation, and is assume to be different depending on a login user.

An item of immediate execution C104 indicates whether a button is a button for immediately executing a job by being pressed, and "Yes" means that the button is the immediate execution button. An item of image output-related C105 indicates whether a button is related to an image output function. For example, since a button whose name is "copy" is a button for outputting read data on paper, the column of C105 indicates "Yes". An item of image generation-related C106 indicates whether a button is related to an image generation function. For example, since a button whose name is "scan and send" is a button for reading a document with the scanner 107 and generating document image data, the column of C106 indicates "Yes". An item of FAX reception-related C107 indicates whether a button is related to a FAX reception function. An item of an application in use C108 indicates a name of an application that actually operates when a button is selected.

In the present exemplary embodiment, the button list is managed as an ordered list, and the top button on the list is assumed to be the highest ranked button. That is, on the button list illustrated in Table 1, assume that a button having an identifier 001 is a button having the highest priority, and is displayed on the leftmost side of the home screen. Since only three buttons are displayed on the smart home screen, buttons corresponding to identifiers 001 to 003 are sequentially arranged from the left, but buttons corresponding to an identifier 004 or subsequent identifiers are arranged from the left in accordance with the order of the list on the second or subsequent pages of the home screen. Elements included in the button list are not limited to the elements described above, and may include other elements. In the subsequent flow, the operation processing unit 204 performs processing of changing the arrangement order on this button list, and thereafter displays the smart home screen.

Subsequently, in S702 to S704, the operation processing unit 204 applies a rule for changing a button display status to the button list after the flow of S701. The rule for changing the button display status is a software module that is applied to Table 1 to change a content of the item of displayable C103 with respect to each button on the button list in accordance with a predetermined rule. Assume that the rule for changing the button display status is preliminarily included in the operation processing unit 204 in the present exemplary embodiment, but may be managed in another form, such as by being supplied from the outside of the image processing apparatus 1. As an example of the rule for changing the button display status, reflecting the status of the image processing apparatus 1 on the item of displayable C103 can be conceived. Specifically, in a case where the FAX unit 106 is not available due to an administrator's setting or the like, the operation processing unit 204 sets the item of displayable C103 with respect to a button indicating that the item of the application in use C108 is "FAX" to "No". Similarly, to change the display status of a button with some kind of an event other than FAX serving as a trigger, the operation processing unit 204 sets and applies a rule for changing a display status of each button. Table 2 illustrates an example of the button list obtained by applying the rule for changing the button display status regarding FAX exemplified above to the button list of Table 1 (after the flow in S704). The item of displayable C103 with respect to the button having the identifier 004 is changed to "No", and the corresponding button is hidden or grayed out on the home screen.

Subsequently, in S705 to S707, the operation processing unit 204 applies a rule for changing a button arrangement order to the button list (in Table 2) after the flow in S704. The rule for changing the button arrangement order is a software module that is applied to the button list to change the order of buttons on the button list. Assume that the rule for changing the button arrangement order is preliminarily included in the operation processing unit 204 in the present exemplary embodiment, but may be managed in another form, such as by being supplied from the outside of the image processing apparatus 1. In the present exemplary embodiment, assume that there are three events regarding the status of the image processing apparatus 1: an event in which "there is a document is on the scanner 107", an event in which "a print job associated with a login user is accumulated", and an event of the "document left-behind status". Since the rule for changing the button arrangement order is applied in response to each event, a processing loop from S705 to S707 is executed three times in the present exemplary embodiment. In a case where one of the events is eliminated, for example, in a case where "a print job associated with the login user is not accumulated", there are the two events subject to the rule for changing the button arrangement order, and the number of times of executing the processing loop from S705 to S707 becomes two. The first event is that "there is a document on the scanner 107". The operation processing unit 204 changes the order of the button list (in Table 2) in accordance with the physical status of the image processing apparatus 1 (presence/absence of the document on the scanner 107). The CPU 100 determines that it is possible to read a document if the document is preliminarily placed on the scanner 107 of the image processing apparatus 1. With this serving as a trigger, the operation processing unit 204 changes the order of the button list so that buttons each indicating that the item of image generation-related C106 is "YES" are ranked higher.

Table 3 illustrates a button list after the rule for changing the button arrangement order is applied to the button list (in Table 2) based on the first event. The arrangement order is changed so that buttons of "copy", "send to myself", "fax", and "scan and send" each indicating that the item of image generation-related C106 is "Yes" are ranked higher. Accordingly, the arrangement order is changed so that buttons each indicating that the item of image generation-related C106 is "No" are ranked lower.

TABLE 2

| The button list after the flow in S704 | | | | | | | |
|---|---|---|---|---|---|---|---|
| Identifier C101 | Button name C102 | Displayable C103 | Immediate execution C104 | Image output-related C105 | Image generation-related C106 | FAX reception-related 107 | Application in use C108 |
| 001 | Copy | Yes | NO | Yes | Yes | No | Copy |
| 002 | Print received document | Yes | Yes | Yes | No | Yes | Confidential box |
| 003 | Send to myself | Yes | Yes | No | Yes | No | Scan and send |
| 004 | FAX | No | No | No | Yes | No | Fax |
| 005 | Scan and send | Yes | No | No | Yes | No | Scan and send |
| 006 | Print | Yes | No | Yes | No | No | Print |

TABLE 3

The button list after execution of the flow of priotizing image generation-related buttons

| Identifier C101 | Button name C102 | Displayable C103 | Immediate execution C104 | Image output-related C105 | Image generation-related C106 | FAX reception-related 107 | Application in use C108 |
|---|---|---|---|---|---|---|---|
| 001 | Copy | Yes | NO | Yes | Yes | No | Copy |
| 003 | Send to myself | Yes | Yes | No | Yes | No | Scan and send |
| 004 | FAX | No | No | No | Yes | No | Fax |
| 005 | Scan and send | Yes | No | No | Yes | No | Scan and send |
| 002 | Print received document | Yes | Yes | Yes | No | Yes | Confidential box |
| 006 | Print | Yes | No | Yes | No | No | Print |

The second event is that "a print job associated with the login user is accumulated". The operation processing unit 204 changes the order of the button list (in Table 3) depending on the presence/absence of the print job accumulated in the image processing apparatus 1. The print job is accumulated in the image processing apparatus 1 by a user preliminarily transmitting the print job to the image processing apparatus 1 via an external apparatus. The order of the button list (in Table 3) is changed so that applications capable of executing the print job are ranked higher. In the present exemplary embodiment, the order of the button list is changed so that a button indicating that the item of the application in use C108 is "print" is ranked higher on the button list. A user who has logged in to the image processing apparatus 1 and a user who has transmitted a print job from an external apparatus are associated with each other by the user information management unit 202 or the like. The operation processing unit 204 refers to only the presence/absence of the print job associated with the user who has logged in the image processing apparatus 1 when changing the button list. That is, even if print jobs are accumulated in the image processing apparatus 1, the presence of these print job has no influence on the order of the button list unless a print job for the login user is included in these print jobs.

Table 4 illustrates a button list after the rule for changing the button arrangement order is applied to the button list illustrated in Table 3. The arrangement order is changed so that the print button indicating that the item of the application in use C108 is "print" is ranked higher. As a result of applying the rule for changing the button arrangement order based on the second event, it can be found that the smart button for "print", which has been ranked low on the button list at the time of the first event because the item of image generation-related C106 indicates "NO", is ranked the highest on the button list.

The third event is the "document left-behind status". With the determination of a document being left behind on the platen glass (hereinafter referred to as the document left-behind status) serving as a trigger, the CPU 100 changes the order of the button list (in Table 4) so that buttons each indicating that the item of image generation-related C106 is "Yes" are ranked lower on the button list. Since the event in which the document is left behind on the platen glass is determined to be an event that is unrelated to the login user, buttons for applications using the platen glass (image generation-related buttons) are ranked lower on the button list.

Figure 9:
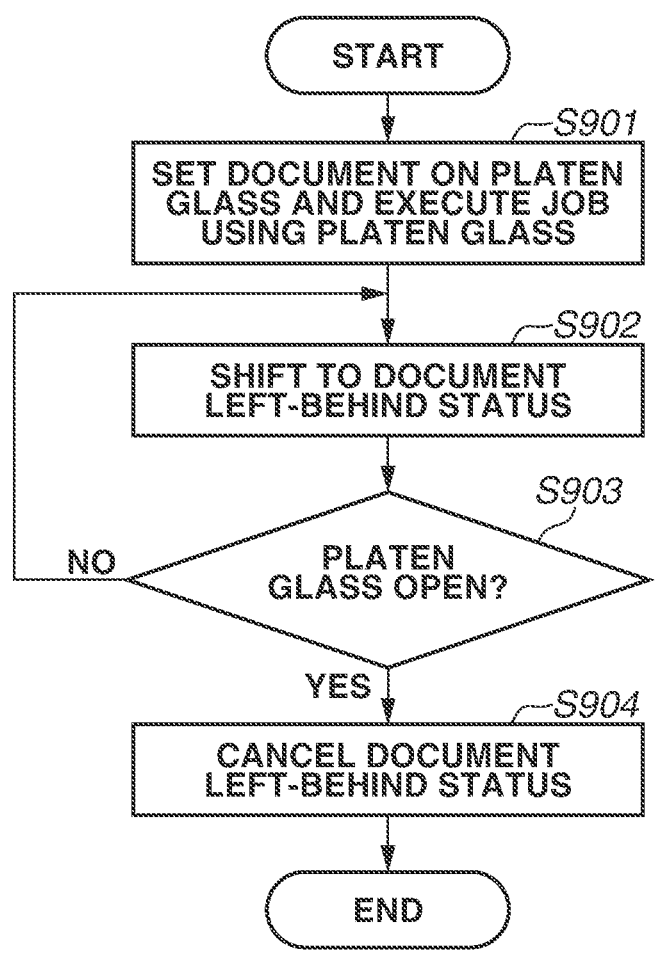
FIG. 9 is a flowchart illustrating an example of transition to a document left-behind status according to the exemplary embodiment.

FIG. 9 illustrates a flowchart for determining the document left-behind status. In S901, when a document is set on the platen glass, a job using the document is executed. In S902, the image processing apparatus 1 then makes a transition to the document left-behind status. Whether the image processing apparatus 1 is in the document left-behind status may be managed with ON/OFF of a flag. In S903, the CPU 100 detects whether the platen glass is opened. The document left-behind status continues until the CPU 100 detects the opening of the platen glass. If the CPU 100 detects the opening of the platen glass (YES in S903), the processing proceeds to S904. In S904, the document left-behind status of the image processing apparatus 1 is canceled.

In the present exemplary embodiment, the image processing apparatus 1 makes a transition to the document left-behind status when executing the job using the document, but may take a predetermined time until making a transition to the status. Alternatively, the image processing apparatus 1 may make a transition to the document left-behind status in response to a logout of the user in a state where the document is placed on the platen glass. Still alternatively,

TABLE 4

The button list after execution of the flow of priotizing the button for printing a print job registred by the user

| Identifier C101 | Button name C102 | Displayable C103 | Immediate execution C104 | Image output-related C105 | Image generation-related C106 | FAX reception-related 107 | Application in use C108 |
|---|---|---|---|---|---|---|---|
| 006 | Print | Yes | No | Yes | No | No | Print |
| 001 | Copy | Yes | NO | Yes | Yes | No | Copy |
| 003 | Send to myself | Yes | Yes | No | Yes | No | Scan and send |
| 004 | FAX | No | No | No | Yes | No | Fax |
| 005 | Scan and send | Yes | No | No | Yes | No | Scan and send |
| 002 | Print received document | Yes | Yes | Yes | No | Yes | Confidential box | instead of using the method of making a transition to the document left-behind status in response to the execution of a job, the image processing apparatus 1 may determine whether a document is left behind in combination of a result of detection as to whether there is a document on the platen glass, an elapsed time from the detection of the state, and the like.

Table 5 illustrates a button list after the rule for changing the button arrangement order is applied to the button list illustrated in Table 4. The arrangement order is changed so that the buttons for "copy", "send to myself", "fax", and "scan and send" each indicating that the item of image generation-related C106 is "Yes" are ranked lower.

TABLE 5

| Identifier C101 | Button name C102 | Displayable C103 | Immediate execution C104 | Image output-related C105 | Image generation-related C106 | FAX reception-related 107 | Application in use C108 |
|---|---|---|---|---|---|---|---|
| 006 | Print | Yes | No | Yes | No | No | Print |
| 002 | Print received document | Yes | Yes | Yes | No | Yes | Confidential box |
| 001 | Copy | Yes | NO | Yes | Yes | No | Copy |
| 003 | Send to myself | Yes | Yes | No | Yes | No | Scan and send |
| 004 | FAX | No | No | No | Yes | No | Fax |
| 005 | Scan and send | Yes | No | No | Yes | No | Scan and send |

In a case where the status of the image processing apparatus 1 when a user logs in to the image processing apparatus 1 is any one of statuses corresponding to the following four events, the button list illustrated in Table 5 is obtained. The four events are the event in which "the FAX unit 106 is not available", the event in which "there is a document on the scanner 107", the event in which "a print job associated with the login user is accumulated", and the event of the "document left-behind status". The description has been given assuming that "the FAX unit 106 is not available" in the present exemplary embodiment. However, in a case where the FAX unit 106 is available, the item of displayable C103 for the smart button for "FAX" indicates "Yes", and the smart button for "FAX" is displayed between the smart button for "send to myself" and the smart button for "scan and send".

Subsequently, in S708, the operation processing unit 204 draws the smart home screen in accordance with contents of the determined button list. Since the present exemplary embodiment assumes that the three buttons are arranged on one screen of the home screen as illustrated in FIG. 6C, the top three smart buttons on the button list illustrated in Table 5 (i.e., the smart buttons for "print", "print received document", and "copy") are displayed on the display unit 120 immediately after the user logs in to the image processing apparatus 1. Lower ranked buttons from the smart button for "send to myself" and subsequent buttons are arranged on the second or subsequent screens. Since the smart button for "send to myself" indicates that the item of the immediate execution C104 is "Yes", the immediate execution icon 634 is added on the smart button for "send to myself".

Figure 8A:
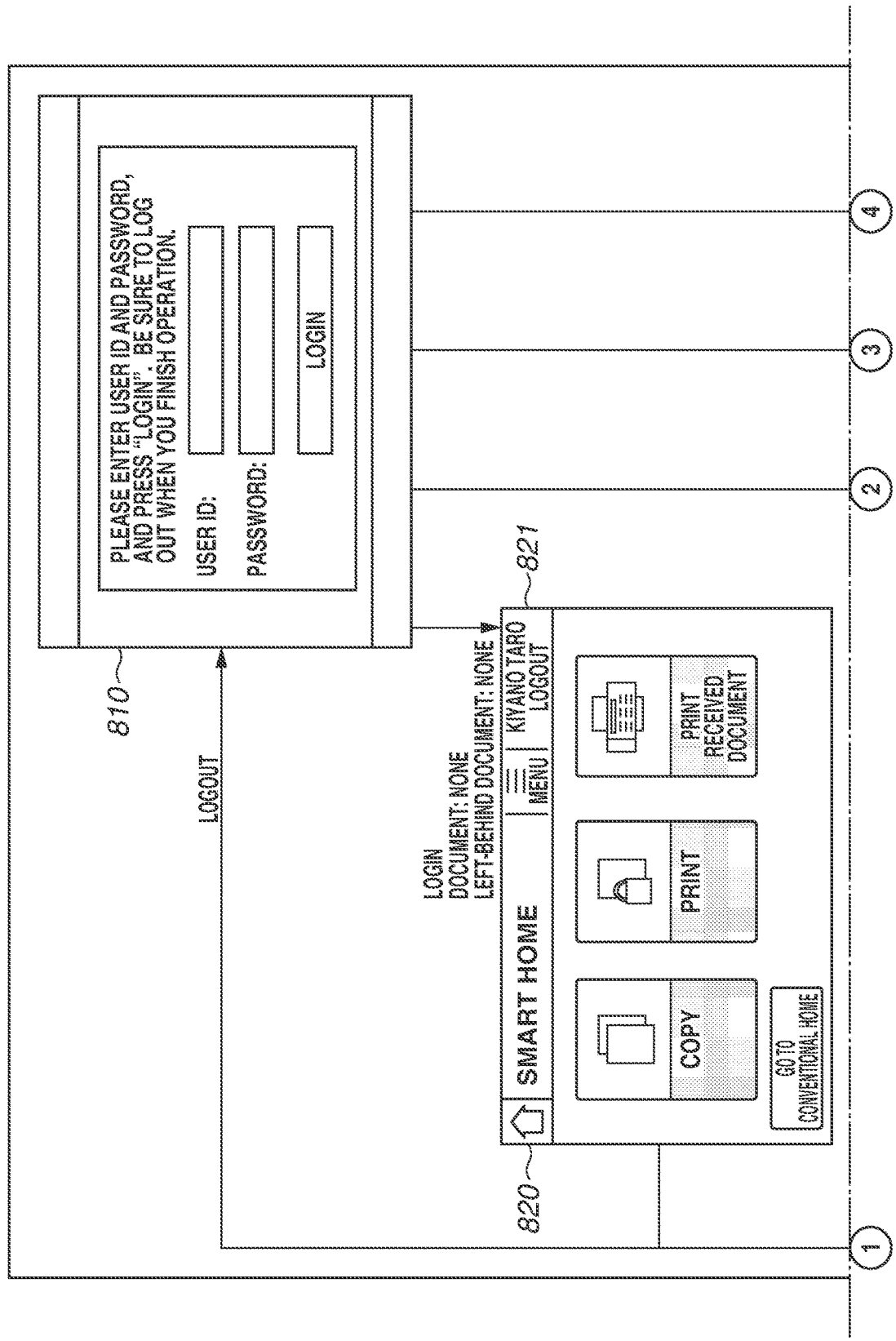

FIGS. 8A to 8C are a screen transition diagram of the smart home screen according to the present exemplary embodiment. These transition screens are displayed on the display unit 120 of the image processing apparatus 1.

A login screen 810 is a screen for the user to log in to the image processing apparatus 1, and is similar to the screen described with reference to FIG. 4. After authentication succeeds on the login screen 810, any one of smart home screens, which will be described below, is displayed in accordance with the status of the image processing apparatus 1 at the time of the login.

Each smart home screen is provided in common with a logout button 821 for the user to log out. In a case where the user logs out, the image processing apparatus 1 makes a transition to the login screen 810. As described in the first exemplary embodiment, contents displayed on the smart home screen change in accordance with the status of the image processing apparatus 1 and a usage situation of the user.

Specifically, at the time of the login, in a case where the image generation unit 131 detects no document and there is no print job for the login user in the user information management unit 202, the image processing apparatus 1 makes a transition to a smart home screen 820. At the time of the login, in a case where the image generation unit 131 detects a document and there is no print job for the login user in the user information management unit 202, the image processing apparatus 1 makes a transition to a smart home screen 830. At the time of the login, in a case where the image generation unit 131 detects no document and there is a print job for the login user in the user information management unit 202, the image processing apparatus 1 makes a transition to a smart home screen 840. At the time of the login, in a case where the image generation unit 131 detects a document and there is a print job for the login user in the user information management unit 202, the image processing apparatus 1 makes a transition to a smart home screen 850.

In a case where the user places a document with the smart home screen 820 being displayed and the image generation unit 131 detects the document, the image processing apparatus 1 makes a transition to the smart home screen 830.

In a case where no document exits any more on a scanner unit by removal of the document from the scanner unit by the user or execution of processing on the document with the smart home screen 830 being displayed, the image generation unit 131 stops detecting a document, and the image processing apparatus 1 makes a transition to the smart home screen 820.

In a case where the image generation unit 131 detects a document with the smart home screen 840 being displayed, the image processing apparatus 1 makes a transition to the smart home screen 850. In a case where the user performs processing, such as execution of a job with the smart home screen 840 being displayed, and there is no print job for the login user in the user information management unit 202, the image processing apparatus 1 makes a transition to the smart home screen 820.

In a case where the image generation unit 131 stops detecting a document with the smart home screen 850 being displayed, the image processing apparatus 1 makes a transition to the smart home screen 840. In a case where no print job for the login user exits any more in the user information management unit 202 with the smart home screen 850 being displayed, the image processing apparatus 1 makes a transition to the smart home screen 830.

Regarding the order of applying rules for changing the button arrangement order, a rule regarding an event that is detected later may be applied later in such a case as a second exemplary embodiment. For example, in a case where the user logs in to the image processing apparatus 1 and the image processing apparatus 1 detects a print job associated with the user, and thereafter the user places a document on the scanner unit, the image processing apparatus 1 applies a rule for changing the button arrangement order regarding the event in which "a print job associated with the login user is accumulated", and thereafter applies a rule for changing the button arrangement order regarding the event in which "there is a document on the scanner unit". In this case, the image processing apparatus 1 stores a time at which the event is detected.

As described above, the image processing apparatus 1 performs processing of changing the arrangement order of buttons displayed on the home screen in accordance with the status of the image processing apparatus 1. Displaying a smart button that is assumed to have a high likelihood of being pressed by the user on a priority basis can increase operability of the user at the time of utilizing the image processing apparatus 1.

In the present exemplary embodiment, in determining the button list, the image processing apparatus 1 applies the rules for changing the button arrangement order in order of the event in which "there is a document on the scanner 107", and the event of the "document left-behind status". However, the order of applying the rules is not limited thereto. The events may have a priority relationship. For example, in a case of detecting the event of the "document left-behind status" first and then detecting a corresponding event, the image processing apparatus 1 is configured not to check an event subsequent to the corresponding event. Alternatively, a rule to be applied later may be determined in advance, or the order of applying rules may be made changeable so that the user can set the order of applying the rules. In addition, in a case where a plurality of rules is applied, a button to which a rule is applied many times may be ranked higher. Also to change the button arrangement order with an event other than the events described above serving as a trigger, setting the rule for changing the button arrangement order and software modularization can similarly achieve the change in the button arrangement order. In addition, even if there is a multitude of events that have an influence on the arrangement order, appropriately managing the order of applying the rules for changing the button arrangement order can achieve the button arrangement taking into consideration of the user's intention.

In the present exemplary embodiment, the description has been given of the example of rearranging buttons in a case of detecting the plurality of events that changes the button list. However, also in a case where only one event that changes the button arrangement order can be detected, the rule for changing the button arrangement order may be similarly applied in accordance with the corresponding event to rearrange the buttons.

In the first exemplary embodiment, the image processing apparatus 1 makes a transition to the "document left-behind status" in a case of executing a job with a document being placed on the platen glass, and does not display image generation-related buttons on a priority basis until the platen glass is opened. If the user who places a document on the platen glass and the login user are identical, there may be a case where the image processing apparatus 1 executes a job again using a document for an executed job.

In a second exemplary embodiment, a description will be given of a configuration of changing a display position of a button indicating that the item of image generation-related C106 is "Yes" to be ranked higher even in the document left-behind status. The basic configuration of the present exemplary embodiment is identical to that of the first exemplary embodiment, so that only a difference will be described.

Processing executed in S708 or subsequent operations will be described with reference to FIG. 10.

In a case where an event that changes the button arrangement order occurs after the home screen is displayed in S708, each unit is requested to notify the operation processing unit 204 of the occurrence of the event. Specifically, the user information management unit 202 is requested to notify the operation processing unit 204 in a case where the status of a print job associated with the login user is changed. In addition, the job processing unit 203 is requested to notify the operation processing unit 204 in a case where a status as to whether the image generation unit 131 can read a document is changed.

In a case where the operation processing unit 204 receives a notification from each unit, such as the user information management unit 202 and the job processing unit 203, after the request for notification of the occurrence of the event that changes the button arrangement order, the processing illustrated in FIG. 10 is executed. Assume that the detection of the occurrence of the event described above is performed only during the display of the smart home screen, and the request for notification is canceled when the image processing apparatus 1 makes a transition to another screen.

In S1001, after the home screen is displayed in S708, illustrated in FIG. 7, the authentication processing unit 201 determines whether logout processing has been executed. In a case where the authentication processing unit 201 determines that the logout processing has not been executed (NO in S1001), the processing proceeds to S1002. In a case where the authentication processing unit 201 determines that the logout processing has been executed (YES in S1001), the processing ends. When the user logs in to the image processing apparatus 1 again, the processing illustrated in FIG. 7 is executed.

In S1002, the user information management unit 202 determines whether there is a job associated with the login user. In a case where there is the associated job (YES in S1002), the processing proceeds to S1004. In a case where there is no associated job (NO in S1002), the processing proceeds to S1003. In S1004, the operation processing unit 204 applies the rule for changing the button arrangement order in response to the events excluding the event of the "document left-behind status". That is, the operation processing unit 204 applies the rule for changing the button arrangement order in response to the event in which "there is a document on the scanner 107" and the event in which "a print job associated with the login user is accumulated", and displays image generation-related buttons on a priority basis.

In S1003, the operation processing unit 204 applies the rule for changing the arrangement order in response to the event excluding the event in which "a print job associated with the login user is accumulated" and the event of the "document left-behind status". That is, the operation processing unit 204 applies the rule for changing the button arrangement order in response to the event in which "there is a document on the scanner 107", and displays image processing-related buttons on a priority basis.

In S1005 and S1006, the operation processing unit 204 displays the buttons on the display unit 120 in accordance with the button arrangement order determined in S1003 or S1004. The description about FIG. 10 ends here.

As described above, if the user who places a document on the platen glass and the login user are identical, the image processing apparatus 1 displays image generation-related buttons on a priority basis without regarding its status as the document left-behind status.

Other Exemplary Embodiment

Some embodiments can also be realized by a computer of a system or apparatus that reads out and executes computer-executable instructions recorded on a storage medium (e.g., non-transitory computer-readable storage medium) to perform the functions of one or more of the above-described embodiment(s), and by a method performed by the computer of the system or apparatus by, for example, reading out and executing the computer-executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-157893, which was filed on Sep. 18, 2020 and which is hereby incorporated by reference herein in its entirety.

What is claimed is:

1. An image processing apparatus having a plurality of functions, comprising:
    a scanner configured to read a document;
    a first sensor configured to detect a document placed on the scanner; and
    one or more processors and one or more memories that are configured to implement:
        a display control unit configured to display a menu screen on which an icon for causing the image processing apparatus to execute processing pertaining to reading by the scanner is arranged; and
        a determination unit configured to determine whether a document is left behind on the scanner,
    wherein, in a case where the document is detected by the first sensor and where the determination unit determines that the document is not left behind, the display control unit displays the menu screen on which the icon is arranged, and
    wherein, in a case where the document is detected by the first sensor and where the determination unit determines that the document is left behind, the display control unit displays the menu screen on which the icon is not arranged.

2. The image processing apparatus according to claim 1, wherein a status in which the document is left behind and which is determined by the determination unit is a status from execution of a job using the document placed on the scanner to removal of the document from the scanner.

3. The image processing apparatus according to claim 1, wherein the display control unit changes a display order of a plurality of icons on the menu screen or hides part of the plurality of icons in the case where the document is detected by the first sensor and where the determination unit determines that the document is left behind.

4. The image processing apparatus according to claim 1, wherein the icon arranged on the menu screen in a case where the first sensor detects presence of the document is either an icon corresponding to a copy function or an icon corresponding to a scan function.

5. The image processing apparatus according to claim 1, wherein the icon is arranged on a first home screen displayed after a user logs in to the image processing apparatus.

6. The image processing apparatus according to claim 5, wherein the display control unit is configured to switch display between the first home screen and a second home screen on which a result of detection by the first sensor has no influence on display of the icon.

7. The image processing apparatus according to claim 1, further comprising a second scanner configured to read the document,
    wherein, in a case where the determination unit determines that the document is left behind and a document is placed on the second scanner, the display control unit is configured to output notification that the document is left behind, while displaying an icon corresponding to a function using the document placed on the second scanner on a priority basis.

8. The image processing apparatus according to claim 1, wherein, in the case where the document is detected by the first sensor and where the determination unit determines that the document is left behind, the display control unit displays the menu screen on which a second icon is arranged, without displaying the menu screen on which the icon is arranged.

9. The image processing apparatus according to claim 8, wherein the one or more processors and the one or more memories are further configured to implement a management unit configured to manage, among a plurality of the icons, an icon related to detecting the document by the first sensor and an icon related to the information detected by the second sensor, and
    wherein the display control unit is configured to control the display method of displaying the icon based on information managed by the management unit.

10. The image processing apparatus according to claim 8, wherein the second icon is an icon regarding a print job.

11. The image processing apparatus according to claim 1, wherein, in the case where the document is detected by the first sensor and where the determination unit determines that the document is not left behind, the display control unit controls a display method of displaying the icon on a basis of detecting the document by the first sensor, and wherein, in the case where the document is detected by the first sensor and where the determination unit determines that the document is left behind, even though the document is detected by the first sensor, the display control unit controls the display method of displaying the icon without being based on detecting the document by the first sensor.

12. The image processing apparatus according to claim 11, wherein, in a case where the document is detected by the first sensor and where the determination unit determines that the document is not left behind, the display control unit is configured to display the icon in a display method different from a display method of displaying a second icon.

13. The image processing apparatus according to claim 12, wherein the icon is displayed with a higher priority over the second icon.

14. The image processing apparatus according to claim 1, wherein, in the case where the document is detected by the first sensor and where the determination unit determines that the document is left behind, the display control unit controls the display method of displaying the icon on a basis of information detected by a second sensor.

15. The image processing apparatus according to claim 14, wherein the second sensor is configured to detect presence/absence of a print job, and wherein, in the case where the document is detected by the first sensor and where the determination unit determines that the document is left behind, the display control unit controls the display method of displaying the icon on a basis of information detected by the second sensor.

16. The image processing apparatus according to claim 1, wherein, in the case where the document is detected by the first sensor and where the determination unit determines that the document is not left behind, the display control unit arranges either an icon corresponding to a copy function or an icon corresponding to a scan function on the menu screen.

17. An image processing apparatus, comprising:

a scanner configured to read a document placed on document table; and one or more processors and one or more memories that are configured to implement:

a display control unit configured to display a menu screen on which an icon for causing the image processing apparatus to execute reading by the scanner is arranged, wherein, in a case where the document is placed on the document table, the display control unit displays the menu screen on which the icon is arranged at a predetermined position on the menu screen, and wherein, on a basis of detection information about whether the document table is opened after the execution of reading of the document by the scanner based on a selection of the icon, the display control unit displays the menu screen on which the icon is not arranged at the predetermined position on the menu screen.

18. The image processing apparatus according to claim 17, wherein, in the case where the document table is not opened after executing the reading of the document by the scanner based on the selection of the icon and where the document is placed on the document table, the display control unit displays the menu screen that does not include the icon.

19. The image processing apparatus according to claim 17, wherein, in the case where the document table is not opened after executing the reading of the document by the scanner based on the selection of the icon and where the document is placed on the document table, the display control unit displays the menu screen on which the icon is not arranged at the predetermined position on the menu screen and which includes a message saying that the document is left behind.

20. The image processing apparatus according to claim 17, wherein, on a basis of absence of detection that the document table is opened after the execution of reading of the document by the scanner based on the selection of the icon, the display control unit displays the menu screen on which the icon is not arranged at the predetermined position on the menu screen.

21. A control method for an image processing apparatus having a plurality of functions, the method comprising:

reading a document;

performing first detection to detect a document placed on a scanner;

determining whether a document is left behind on the scanner;

in a case where the document is detected by the first detection and where the determining determines that the document is not left behind, displaying a menu screen on which an icon for causing the image processing apparatus to execute processing pertaining to reading by the scanner is arranged; and in a case where the document is detected by the first detection and where the determining determines that the document is loft behind, the displaying displays a menu screen on which the icon is not arranged.

22. A non-transitory storage medium storing instructions that when executed by one or more processors control the one or more processors to operate as the following units of an image processing apparatus having a plurality of functions, the image processing apparatus comprising:

a scanner configured to read a document;

a first sensor configured to detect a document placed on the scanner;

a display control unit configured to display a menu screen on which an icon for causing the image processing apparatus to execute processing pertaining to reading by the scanner is arranged; and a determination unit configured to determine whether a document is left behind on the scanner, wherein, in a case where the document is detected by the first sensor and where the determination unit determines that the document is not left behind, the display control unit displays the menu screen on which the icon is arranged, and wherein, in a case where the document is detected by the first sensor and where the determination unit determines that the document is left behind, the display control unit displays the menu screen on which the icon is not arranged.

* * * * *